United States Patent
Fretz et al.

(10) Patent No.: US 11,347,698 B2
(45) Date of Patent: May 31, 2022

(54) GARBAGE COLLECTION FOR HASH-BASED DATA STRUCTURES

(71) Applicant: Target Brands, Inc., Minneapolis, MN (US)

(72) Inventors: Christopher Fretz, Harleysville, PA (US); Hrishikesh V. Prabhune, Sunnyvale, CA (US); Luis F. Stevens, San Jose, CA (US)

(73) Assignee: Target Brands, Inc., Minneapolis, MN (US)

( * ) Notice: Subject to any disclaimer, the term of this patent is extended or adjusted under 35 U.S.C. 154(b) by 258 days.

(21) Appl. No.: 16/593,669

(22) Filed: Oct. 4, 2019

(65) Prior Publication Data

US 2021/0103564 A1    Apr. 8, 2021

(51) Int. Cl.
| | | |
|---|---|---|
| *G06F 7/00* | (2006.01) | |
| *G06F 16/18* | (2019.01) | |
| *G06F 12/02* | (2006.01) | |
| *G06F 16/901* | (2019.01) | |
| *G06F 16/14* | (2019.01) | |

(52) U.S. Cl.
CPC ...... *G06F 16/1847* (2019.01); *G06F 12/0253* (2013.01); *G06F 16/148* (2019.01); *G06F 16/9014* (2019.01)

(58) Field of Classification Search
CPC ............... G06F 16/215; G06F 16/2315; G06F 16/1748; G06F 16/9014; G06F 16/148; G06F 16/0253
USPC .......................... 707/824, 827, 794, 781, 735
See application file for complete search history.

(56) References Cited

U.S. PATENT DOCUMENTS

| | | | | |
|---|---|---|---|---|
| 5,560,003 | A  * | 9/1996 | Nilsen | G06F 12/0253 |
| 5,911,144 | A  * | 6/1999 | Schwartz et al. | G06F 16/215 |
| | | | | 707/813 |
| 6,823,351 | B1 * | 11/2004 | Flood | G06F 12/0276 |
| 6,826,583 | B1 * | 11/2004 | Flood | G06F 12/0269 |
| 6,965,905 | B2 * | 11/2005 | Garthwaite | G06F 12/0276 |
| 6,988,180 | B2 | 1/2006 | Kadatch | |
| 8,301,654 | B2 | 10/2012 | Kodama | |
| 8,874,842 | B1 | 10/2014 | Kimmel | |
| 9,229,869 | B1 | 1/2016 | Parakh | |
| 9,846,645 | B1 * | 12/2017 | Gidra | G06F 12/0261 |
| 2004/0083347 | A1 | 4/2004 | Parson | |
| 2004/0122874 | A1* | 6/2004 | Garthwaite | G06F 12/0276 |
| 2007/0266037 | A1* | 11/2007 | Terry | G06F 3/0607 |
| 2010/0185703 | A1 | 7/2010 | Ylonen | |

(Continued)

FOREIGN PATENT DOCUMENTS

EP        2372520 A1 *  5/2011

OTHER PUBLICATIONS

Maged M. Michael, "High Performance Dynamic Lock-Free Hash Tables and List-Based Sets"; ACM; 2002.*

(Continued)

*Primary Examiner* — Daniel A Kuddus
(74) *Attorney, Agent, or Firm* — Merchat & Gould P.C.

(57) ABSTRACT

Examples disclosed herein are relevant to garbage collection for data structures, such as hash tables. The data structure can store garbage collection values for use during a garbage collection process. The garbage collection values can have a value indicating the occurrence of a poisoned status. Disclosed configurations can be suited for use in high-performance computing applications.

19 Claims, 10 Drawing Sheets

(56) References Cited

U.S. PATENT DOCUMENTS

| | | | |
|---|---|---|---|
| 2012/0221774 A1* | 8/2012 | Atkisson | G06F 12/0895 711/103 |
| 2014/0214855 A1 | 7/2014 | Attaluri | |
| 2014/0237004 A1* | 8/2014 | Schreter | G06F 16/215 707/813 |
| 2015/0186266 A1* | 7/2015 | Schreter | G06F 16/215 707/814 |
| 2017/0031815 A1* | 2/2017 | Varma | G06F 12/0891 |

OTHER PUBLICATIONS

Anonymous, "An advanced hash table supporting configurable garbage collection semantics of keys and values: Hash Code <<Development Class<< Java." Java [online]. Retrieved from the Internet: <URL: http://www.java2s.com/Code/Java/Development-Class/Anadvancedhashtablesupportingconfigurablegarbagecollectionsemanticsofkeysandvalues.htm>, 25 pages, Apr. 25, 2019.

Anonymous, "Data Structures and Algorithms Hash Table," Tutorialspoint [online]. Retrieved from the Internet: <URL: https://www.tutorialspoint.com/data_structures_algorithms/hash_data_structure.htm>, 8 pgs., retrieved on Jun. 24, 2019.

Anonymous, "In-Stream Big Data Processing," Highly Scalable Blog [online]. Retrieved from the Internet: <URL: https://highlyscalable.wordpress.com/2013/08/20/in-stream-big-data-processing/>, 19 pgs., published Aug. 20, 2013.

Anonymous, "Modulo operation," Wikipedia [online]. Retrieved from the Internet: <https://en.wikipedia.org/w/index.php?title=Modulo_operation&oldid=901366118>, 7 pgs. Published Jun. 11, 2019.

Black, "hash table," NIST National Institute of Standards and Technology [online]. Retrieved from the Internet: <URL: https://xlinux.nist.gov/dads/HTML/hashtab.html>, published Feb. 12, 2019, 2 pages.

Purcell et al., "Non-blocking hashtables with open addressing," University of Cambridge Computer Laboratory, Technical Report No. 639, 23 pages, Sep. 2005.

Shahriyar et al., "Down for the count? Getting reference counting back in the ring," International Symposium on Memory Management in Beijing, China, 11 pgs, Jun. 15, 2012.

Michael, "High performance dynamic lock-free hash tables and list-based sets." Proceedings of the fourteenth annual ACM symposium on Parallel algorithms and architectures. ACM, pp. 73-82, published Aug. 10, 2002.

* cited by examiner

GARBAGE COLLECTION FOR HASH-BASED DATA STRUCTURES

BACKGROUND

Hash-based data structures include hash tables and hash maps, which associate keys and values. The location of the value in the data structure is typically determined based on a hash of the key using a hash function. A hash function is a function that maps input data to output data, typically mapping arbitrarily sized input data to fixed size output data.

During use, hash-based data structures can accumulate allocated memory locations that are no longer being used, which can degrade performance of the hash table. The process of reclaiming the no-longer-used memory is known as "garbage collection". In the context of high performance computing, garbage collection is particularly challenging. Traditional approaches to garbage collection simply halt entire processes until garbage collection is complete, which is unsuitable for use in high-performance computing operations.

SUMMARY

In an example, there is a method comprising: for a respective garbage collection value of a set of garbage collection values performing a garbage collection operation comprising: determining whether a shared status is indicated based on whether the respective garbage collection value indicates a poisoned status; responsive to determining that a shared status is not indicated, attempting to clear an associated collection map value in a collection map; and responsive to successfully clearing the associated collection map value in the collection map, clearing the poisoned status of the respective garbage collection value.

The respective garbage collection value can be stored as one or more bits of a respective reference count value stored as an integer. The method can further include: responsive to successfully clearing the associated collection map value in the collection map, re-determining whether a shared status is indicated based on the respective garbage collection value, wherein setting the respective garbage collection value to a reset status is further responsive to the re-determination that the shared status is not indicated. Attempting to clear an associated collection map value in a collection map can be further responsive to an associated reference count being equal to zero. Attempting to clear the associated collection map value in the collection map can include clearing the associated collection map value as an atomic operation. The garbage collection operation can be performed for each respective garbage collection value in the set of garbage collection values.

In another example, there is a system comprising one or more processors; and a non-transitory computer-readable medium comprising instructions. The instructions, when executed by the one or more processors, cause the one or more processors to: for each respective garbage collection value of a set of garbage collection values: determine whether a shared status is indicated based on the respective garbage collection value and further based on an associated reference count; responsive to determining that a shared status is not indicated, attempt to clear an associated value in a collection map; and responsive to successfully clearing the associated value in the collection map, clearing the respective garbage collection value.

The instructions can further cause the one or more processors to: responsive to successfully clearing the associated value in the collection map, re-determine whether a shared status is indicated, wherein clearing the respective garbage collection value is further responsive to re-determining that the shared status is not indicated. The instructions can further cause the one or more processors to: responsive to the re-determined respective garbage collection value indicating that a shared status is indicated, replace the associated value in the collection map. The instructions can further cause the one or more processors to: responsive to failing to clear the associated value in the collection map, skip the respective garbage collection value and continue to a next respective garbage collection value in the set of garbage collection values. Attempting to clear the associated value can be performed as an atomic operation. The set of garbage collection values can include at least one garbage collection value indicating a poisoned status. Determining that the shared status is not indicated can be based on the garbage collection value indicating a poisoned status.

In an example, there is a system comprising: a non-transitory computer-readable medium comprising hash table instructions. The hash table instructions can include: initialization instructions that, when executed, cause one or more processors to initialize a hash table including a collection map, a storage array having storage slots, and slots for garbage collection values; insert instructions that, when executed, cause the one or more processors to perform an insert process for inserting a key-value pair into the hash table; lookup instructions that, when executed, cause the one or more processors to perform a lookup process for returning a value corresponding to a given key from a respective storage slot of the hash table; and garbage collection instructions that, when executed, cause the one or more processors to perform a garbage collection operation on the hash table based on the garbage collection values.

The insert instructions can include instructions that, when executed by the one or more processors, cause the one or more processors to: determine whether the insert operation caused a respective storage slot to be inaccessible to a future lookup; and responsive to the insert operation causing a respective storage slot to be inaccessible to a future lookup: set a respective garbage collection value associated with the respective storage slot to a value indicating a poisoned status; and set a value in the collection map corresponding to the respective storage slot. Causing the respective storage slot to be inaccessible to a future lookup can be responsive to overwriting a non-tombstone value in a metadata table of the hash table. The hash table can further include reference count values stored as integers. Each respective garbage collection value of the garbage collection values can be stored as one or more high-order bits of an associated reference count value of the reference count values. The lookup instructions can cause the one or more processors to: responsive to locating a respective storage slot based on a given key and further responsive to reference count being requested, attempt to increment a respective reference count value associated with the respective storage slot; and responsive to the attempt to increment the respective reference count value succeeding, returning a value store in the respective storage slot. Responsive to the attempt to increment the respective reference count value failing, a failure can be returned. The attempt to increment the respective reference count value can fail based on the garbage collection value being set to a poisoned status. The garbage collection operation can include: determine whether a respective garbage collection value of the garbage collection values indicates a poisoned status; responsive to the respective garbage collection value indicating a poisoned status, attempting to clear an associated value in the collection map; and responsive to successfully clearing the associated value in the collection map, clearing the poisoned status in the respective garbage collection value.

BRIEF DESCRIPTION OF THE DRAWINGS

The same number represents the same element or same type of element in all drawings.

DETAILED DESCRIPTION

Figure 1:
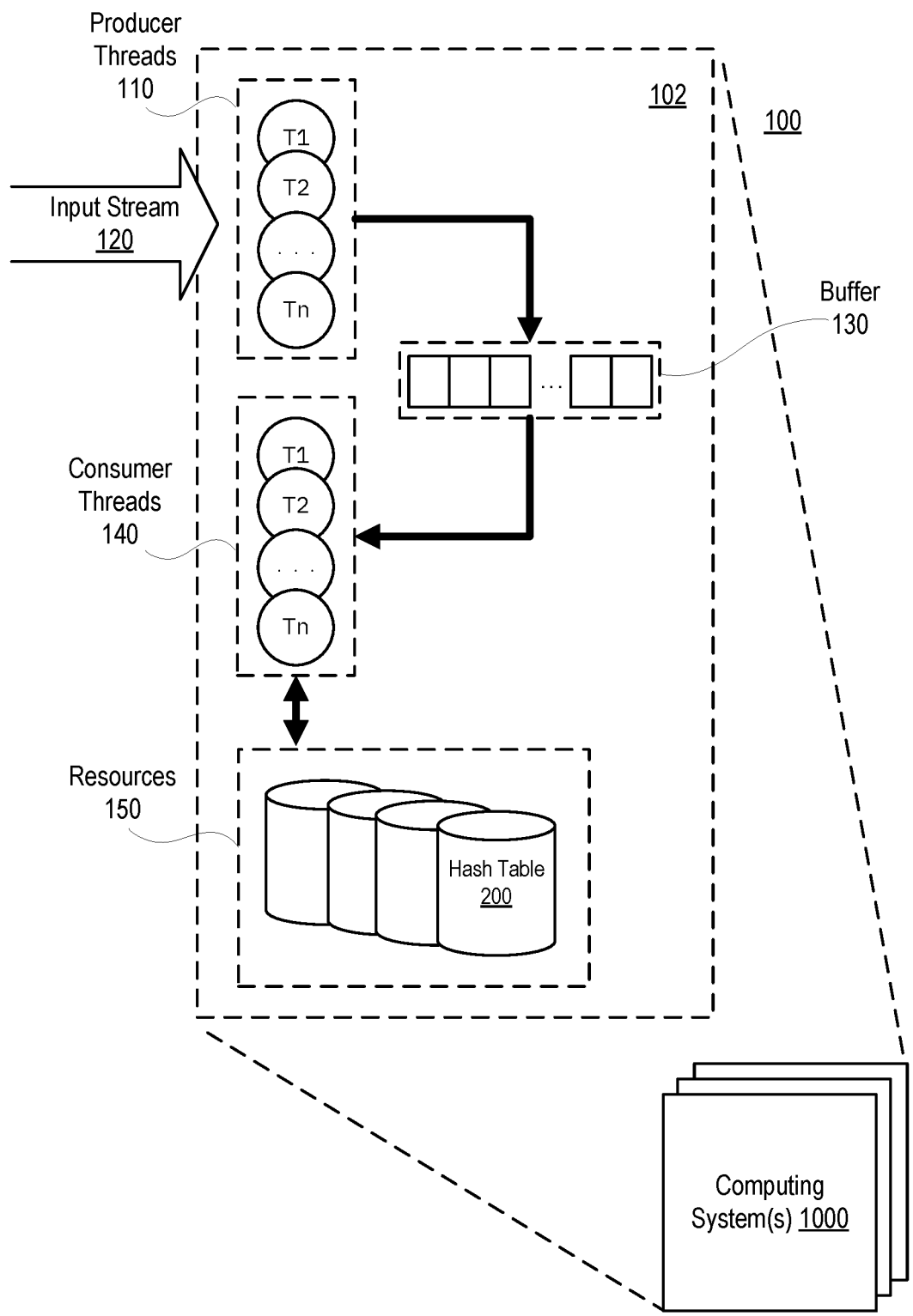
FIG. 1 illustrates an example computing environment that can benefit from use of technologies described herein.

This disclosure describes garbage collection for data structures, including configurations of hash-based data structures that facilitate garbage collection. The data structures disclosed herein can advantageously allow garbage collection in an efficient manner suitable for use with high-performance computing operations. For ease of understanding, many examples herein will refer to hash tables, but a person of skill in the art will understand in view of this disclosure that the technology described herein can be applied to other kinds of data structures and that the technology need not be limited to hash tables, hash maps, or other hash-based data structures. In an example, the technology disclosed herein can be used with the data structures described in U.S. patent application Ser. No. 16/593,636, filed Oct. 4, 2019, titled "Hash-based Data Structure", which is hereby incorporated herein by reference for any and all purposes.

In an example implementation, a hash table stores a garbage collection value, a reference count, and a collection map in addition to other data. The garbage collection value is used to implement a form of in-situ optional reference counting. Garbage collection values can have a value that facilitates determining a status of an associated storage slot. The statuses can include: shared, poisoned, reset, and accessed statuses, among others. A shared status indicates that the associated storage slot is being referenced by at least one thread. A poisoned status indicates that an associated reference count is capped such that the reference count can only decrease until a garbage collection process successfully frees an associated slot. A reset status indicates that the associated slot has been freed and represents an un-poisoning so the slot can be reused to store a new value. The accessed status indicates that garbage collection and reference counting is not used for the associated slot. In some examples, the garbage collection value can directly specify a current status. In other examples, the garbage collection value can indicate whether a poisoned status exists and the status can be inferred based on the garbage collection value and other data. For example, a shared status can be inferred based on the garbage collection value indicating a non-poisoned status and the reference count being non-zero.

The reference count is a value usable to determine when a portion of memory is no longer being referenced, and therefore can be deallocated. In an example, the garbage collection value can be stored as one or more bits (e.g., high-order bits) of the reference count value. Advantageously, this allows both the reference count and the garbage collection value to be modified simultaneously using an atomic operation.

The collection map encodes the indices of the storage array that are available for collection (e.g., have been poisoned). The collection map can be implemented as a bitmap with each bit being associated with a different slot in the storage array.

Certain examples herein can be used in conjunction with a metadata-table-based hash table, such as is described in the "Hash-Based Data Structure" application incorporated by reference above. The data structure can include at least two logical tables: a metadata table and a storage array. In addition, a storage bitmap is used to allocate locations in memory. A bitmap offset based on a hashing function is used to increase the speed at which available locations are able to be located. The storage bitmap allows allocation of locations at an arbitrary bit level within the storage bitmap.

As described above, an example implementation of a hash table can have three primary components: a metadata table, a storage array, and a storage bitmap. The metadata table can hold mapping information that describes associations between hashes of keys and an associated location in the storage array that stores values. Advantageously, the metadata table can facilitate the atomic swapping of arbitrarily sized values, which is traditionally not possible in hash tables. The storage bitmap can be used for the purposes of thread-safe lock-free allocation of locations within the storage array, and supports allocation at arbitrary bit-precision.

In an example implementation, the process of inserting data into or removing data from a hash table further includes garbage-collection-specific operations. For instance, after the value is inserted into the storage array and the metadata table is updated to reflect that location, the thread performing the insertion can take a special action if the location value overwritten in the metadata table of the storage array did not correspond to a tombstone value (e.g., a special value that represents the logical absence of a value) in the storage array. By overwriting a location in the metadata table with a new location, it is now possible that the old location in the storage array is no longer referenced in the metadata table. This can mean that the location is inaccessible to future lookups. In such circumstances, the thread performing the insertion can facilitate garbage collection by setting the garbage collection value associated with the old location to a value indicating a poisoned status. Setting a poisoned value in this way creates a happens-before relationship such that subsequent code can safely assume the value at the location is no longer accessible by future lookups. The thread that performed the lookup then sets a collection map value in the collection map to indicate that the storage associated with the location is potentially ready for garbage collection (e.g., is poisoned). While the poisoned location is no longer accessible from the metadata table, threads may still be able to access that location via, for example, a pointer. But as threads finish accessing the location, the reference count decreases and eventually reaches zero. Once the poisoned reference count reaches zero, the storage slot associated with the location can be safely reclaimed via a garbage collection process.

In a further example implementation, the process of looking up values based on a key can be modified to facilitate garbage collection. For instance, if a lookup thread finds a slot in the storage array corresponding to a hash of a key, the thread can determine whether the slot stores a tombstone value. If so, the thread returns failure to the code requesting lookup. Otherwise, the slot stores a proper value. If reference counting was requested, the thread can attempt to increment the reference count value associated with the slot. But, as described above, because the associated garbage collection value might be poisoned, the thread may be prevented form incrementing the reference count value. If the garbage collection value indicates a poisoned status, then the thread returns failure to the code requesting lookup. If the reference count increments successfully, then a reference to the slot is returned to the calling thread. If reference counting was not requested, thread returns a reference to the storage slot directly.

In an example, whenever desired, one or more threads can perform garbage collection on the hash table, thereby freeing swapped or removed values from the storage array. A garbage collection thread scans across the collection map. For every value in the collection map that indicates the potential availability of garbage collection, the following process is performed. If the garbage collection value associated with the collection map value has a poisoned value and an associated reference count is zero (e.g., no thread currently has a reference to a storage slot associated with the garbage collection value), then the garbage collection thread attempts to atomically clear the set value in the collection map. If the thread is successful in clearing the value in the collection map, then if an associated status is still not a shared status (e.g., the garbage collection value has a poisoned value and an associated reference count is zero), then the garbage collection thread clears the poisoned value from the garbage collection value and frees any associated memory in the storage array (e.g., by updating the storage bitmap to indicate that the location in the storage array is free), thereby reclaiming the slot in the storage array. This re-checking can be advantageous because ABA problems allow for a race where the slot is reallocated to another thread and then removed again between checks. But if a shared status exists after atomically clearing the collection value, then the garbage collection thread raced with another thread performing an insertion, so the garbage collection thread re-sets the value in the collection map. If the attempt to atomically clear the value in the collection map is unsuccessful, then this means that another thread is necessarily handling the collection of the associated slot, so the current thread continues scanning for the next value in the collection map that indicates garbage collection may be available. Advantageously, this allows for multiple threads to perform garbage collection simultaneously.

As described above, disclosed techniques can be used to implement garbage collection in a manner suitable for use in high-performance computing environments. An example of a high-performance computing environment is described in FIG. 1.

Example Environment

FIG. 1 illustrates an example computing environment 100 that can benefit from use of technologies described herein. The computing environment 100 is provided by one or more computing systems 1000 (described in more detail in FIG. 10). In many examples, the one or more computing system 1000 are each one more physical or virtual computers having memory and one or more processors configured to execute instructions stored in the memory. The one or more computing systems 1000 can be configured for particular tasks. In an example, the computing systems 1000 can be high-performance computing systems having special-purpose hardware. The special-purpose hardware can include server- or workstation-grade CPUs (Central Processing Units) supporting high core counts, supporting large amounts of system memory, having large caches, having error correcting capabilities, other features, or combinations thereof. The special-purpose hardware can include GPUs (Graphics Processing Units), AI (Artificial Intelligence) accelerating hardware (e.g., AI-focused processors or co-processors), error-correcting memory, other hardware, or combinations thereof. Further, one or more features can be provided as physical or virtual machines.

The computing environment 100 includes a producer-consumer workflow 102 having one or more producer threads 110 running on the one or more computing systems 1000 (e.g., in parallel). The producer threads 110 each produce data to a buffer 130 for consumption by one or more consumer threads 140. In the illustrated example, the producer threads 110 produce data based, in part, on an input stream 120. The consumer threads 140 run on the one or more computing systems (e.g., in parallel), remove data from the buffer 130, and process the data to produce a result. During this process, one more resources 150 can be used by the consumer threads 140. The one or more resources 150 can include one or more databases, data structures, or other resources. The resources 150 may, but need not, be provided by the one or more computing systems 1000 (e.g., one or more of the resources can be provided by a remote server or other computer). As illustrated, one of the resources 150 is a hash table 200 (described in more detail herein). The hash table 200 can be used to, for example, accumulate state among the consumer threads 140.

Increases in the amount of data in the input stream 120, the complexity of processing required by the consumer threads 140, and the demands by people or systems relying on the producer-consumer workflow 102, can likewise increase the importance of ensuring high performance of the system. While computing resources provided by the computing system 1000 can be scaled up or down from a pool of available computing resources (e.g., processing speed, memory, cache space, energy efficiency), the computing resources are finite, thus improvements to how the data structures and other aspects are processed can yield improvements to the functioning of the one or more computing systems 1000.

Techniques that may be common in traditional computing operations (e.g., blocking processing to wait for other programs to finish a task or otherwise synchronize processing) are unsuitable in operating in such High-Performance Computing (HPC) applications. In addition, HPC systems often use many computing threads running on multiple different processors. As the number of threads increases, so too do difficulties in synchronizing processing and maximizing the use of resources. These difficulties are explained, in part, by what is known in the art as "Amdahl's Law", which predicts that theoretical speedups of parallel processing are limited by the ability of the underlying processes to be parallelized. The HPC technologies are generally relevant to improving the ability of processes to be parallelized and run in HPC settings.

Various kinds of hash-based data structures, such as hash tables, are commonly used in programming contexts. But traditional implementations of hash tables are not suited for use in HPC applications. This is often because traditional hash table implementations (e.g., as found in open source libraries) are designed for general applications rather than the special use cases found in HPC applications. For example, traditional implementations of hash tables create difficulties in synchronizing among multiple threads accessing a single hash table. Traditional solutions to this synchronization problem include locking individual slots in the hash table or the entire hash table itself. But these solutions to synchronization introduce new issues in the context of HPC applications. In particular, locking some or all of the hash table can create significant performance degradation, especially as additional threads are added. Further, traditional hash table implementations can respond to hash collisions using linked-list based chaining at the location of the collision. Although linked-lists are flexible, the traditional manner of allocating linked lists in memory can result in the use of scattered memory locations, which reduces the performance benefits from prefetching.

Further still, such traditional implementations have relatively simple garbage collection capabilities. Such implementations can, for example, halt entire processes until garbage collection is complete, which is unsuitable for use in high-performance computing operations. Some implementations quiescence prior to performing garbage collections, but such moments of inactivity can be rare in the HPC context.

Hashed-based data structures and garbage collection techniques disclosed herein can overcome one or more challenges in traditional hash-based data structures and be more suited for use in HPC applications.

Hash Table

Figure 2:
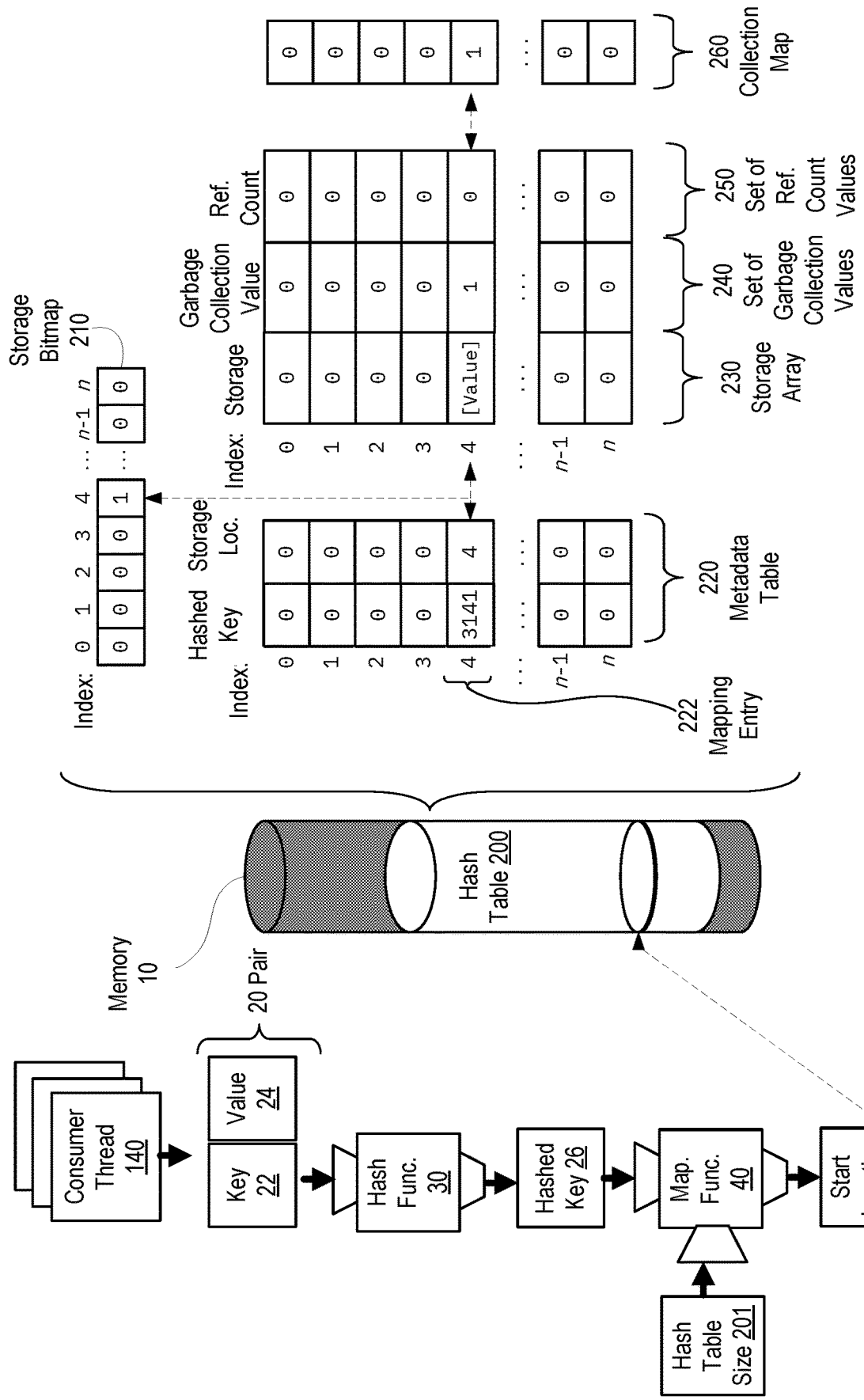
FIG. 2 illustrates a hash table and an associated processes for inserting a value into the hash table.

FIG. 2 illustrates a hash table 200 and associated processes for storing a value 24 associated with a key 22 in a storage slot of the hash table 200. The example hash table 200 shown in FIG. 2 includes features configured to be suitable for use in high-performance computing applications. While the garbage collection technology herein can be suitable for use in such environments, its use need not be so limited and can be used in other computing applications and with other kinds of data structures. So while FIG. 2 illustrates a hash table 200 in an HPC context that can benefit from use of technologies disclosed herein, the technology disclosed herein need not be so limited.

As illustrated, the hash table 200 can be stored in a contiguous block of memory within memory 10. The figure illustrates one or more consumer threads 140 providing a key-value pair 20 that includes the key 22 and the value 24 to be inserted into the hash table 200. The key 22 is hashed using a hash function 30 to produce a hashed key 26. The hashed key 26 is then provided as input into a mapping function 40 that produces a start location 28 in a hash table 200 based on the hashed key 26 and a hash table size 201. The value 24 is then stored in the hash table 200 based on the start location 28.

The memory 10 is electronic storage for a computing device. The memory 10 can be a main memory for a computer (e.g., the computing system 1000). In examples, the memory 10 can be a temporary, addressable storage for holding running programs and associated data for loading into cache memory (e.g., an L2 or L1 cache of a processor) or processor registers for processing, as opposed to long-term general memory storage for a system. The memory 10 can be virtual or physical memory. The memory 10 can be or include shared memory that is accessible to all processors of the computer system. Locations in the memory 10 can be assigned by a memory manager, such as one of an operating system running on the computer.

The key-value pair 20 can be an association between the key 22 and the value 24. The key 22 can be data serving as an identifier associated with the value 24. The value 24 can be a piece of data associated with the key 22. In some examples, the key-value pair 20 is a data structure storing the key 22 and the value 24. In other examples, the key-value pair 20 can be a logical grouping of the key 22 and the value 24.

The hash function 30 is a function that maps input data to output data, typically mapping arbitrarily-sized input data to fixed size output data that is associated with the hash table 200. The output can be an integer. Any of a variety of hash functions 30 can be used. In an example, the hash function 30 is XXHASH. The hash function 30 need not be a cryptographic hash function, but a cryptographic hash function could be used. A hash function 30 can be selected based on relative speed and hash-collision rate. Generally, hash functions 30 having high speed and low hash-collision rates are desirable for use in high-performance applications.

The hashed key 26 is the resulting output from the hash function 30 that is produced when the key 22 is provided as input into and is hashed by the hash function 30.

The mapping function 40 is a function that maps the hashed key 26 to a start location 28 in the hash table 200. The mapping can be achieved by converting the hashed key 26 into a valid location in the hash table 200 based on the hash table size 201. For instance, the hashed key 26 may be the number 371,828 and the hash table 200 may have a hash table size 201 of only 1024 slots. The mapping function 40 can convert the number 371,828 into a valid slot in the hash table 200 (e.g., into a number in the range 0 to 1023, where the hash table 200 is indexed from zero). In an example, the mapping function 40 operates by performing h modulo n, where h is the hashed key 26 in integer form and n is the number of slots in a hash table in integer form. Because modulo operations are often performed using division, they can be rather slow. In examples where n is a power of two, the mapping can performed more quickly by using the equation h & (n−1), where "&" is the bitwise AND operation, h is the hashed key 26 in integer form, and n is the number of slots in a hash table in integer form.

The start location 28 can be the location in the hash table 200 at which the value 24 will be attempted to be inserted first. However, due to a variety of reason (e.g., hash collisions), the start location 28 is not necessarily the location in the hash table 200 where the value 24 will end up. Instead, the start location 28 serves as the location where the search for a location in the hash table 200 begins. In the illustrated arrangement, the start location 28 is the output of the mapping function 40, when the hashed key 26 is provided as input.

The hash table 200 is a data structure that associates keys 22 and values 24, with a location of value 24 in the data structure being determined based on a hash of the key 22 using the hash function 30. The hash table 200 itself includes a storage bitmap 210, a metadata table 220, and a storage array 230. The hash table 200 further includes a set of garbage collection values 240, a set of reference count values 250, and a collection map 260 for use in memory management.

The storage bitmap 210 is a set of bits where each bit encodes storage information regarding the storage array 230. For instance, where the hash table size 201 is 64, the storage array 230 would have sixty-four slots in which values 24 can be stored, so a storage bitmap 210 for the storage array 230 can be represented as a 64-bit integer. In an example, a bit value of zero represents that the given slot is not being used to store a value 24 and a bit value of one represents that the slot is being used to store a value 24. The use of a bitmap for encoding storage information can be beneficial because bitwise operations are often fast to perform in a processor. The storage bitmap 210 can have a constant size. Where the garbage collection processes herein described freeing memory in the hash table, such garbage collection processes can modify bits in the storage bitmap 210 to free associated spots. This can be in addition to or instead of freeing memory using a global memory manager of an operating system of the computing environment 100 (e.g., using the free function in the C programming language).

Traditionally, representations of storage allocation are not needed in hash table implementations because memory for storage by the hash table would be obtained from a global memory allocator (e.g., using the malloc function in the C programming language). But using such memory allocation can present challenges in HPC applications due to slowness and the potential allocation of discontinuous chunks of memory, which can cause performance issues. Here, the storage bitmap 210 acts as a memory manager for the hash table 200. For instance, when initialized, the hash table 200 can be put in a contiguous block of fixed-size memory in the memory 10. After allocation, functions associated with the hash table 200 can use the storage bitmap 210 to provide exclusive access to a chunk of memory to a requesting thread. The actual construction operation for copying data into the storage operation is not atomic, but the storage bitmap 210 can be modified in an atomic operation, thereby allowing for guarantees to be made to accessing threads that if the thread successfully obtains a slot from the bitmap, then it is the only thread to have that spot in the storage array 230.

The metadata table 220 is a data structure storing mapping entries 222. Each mapping entry 222 is an association between a hashed key 26 and a storage location in the storage array. The storage location can be specified in any of a number of ways, such as the index of the storage array 230 where the value 24 corresponding to the hashed key 26 is stored. In other examples, the storage location can be specified as an offset into the storage array 230. The metadata table 220 can be configured to have a fixed size. The metadata table 220 can be implemented in any of a variety of ways. In an example, the metadata table 220 is implemented as an array, such as a circular array.

The storage array 230 is the portion of the hash table 200 where the values are stored. The storage array 230 can be divided into a number of slots. The number of slots corresponds to the hash table size 201. The slots of the storage array 230 can be contiguously allocated. Advantageously, the storage array 230 can allow the values to be stored contiguously in shared memory, which provides for faster operations.

Associated with each of the storage slots of the storage array 230 are a garbage collection value 240 of the set of garbage collection values 240, a reference count value 250 of the set of reference count values 250, and a collection map value of a collection map 260. The values 240, 250, 260 can be stored in any suitable manner. In an example, the storage array 230 can be a multi-dimensional array that stores not only the storage array slots but also the associated values 240, 250, 260.

In an example implementation, the garbage collection value 240 associated with a given slot of the storage array 230 is stored as one or more bits (e.g., high-order bits) of a reference count value 250. The reference count value 250 can be stored as an integer (e.g., an unsigned 64-bit or 32-bit integer), but the integer likely supports higher maximum values than are necessary for storing a reference count value. So one or more high-order bits of an integer representing the reference count value 250 can instead be used to store the garbage collection value 240 while the low-order bits can be used to represent the reference count value 250. In such an implementation, the garbage collection value 240 can be set using bitwise operations and the reference count value 250 can be obtained by masking off the bits that are used to store the garbage collection value 240. Advantageously, this use of a single integer to store both a garbage collection value 240 and a reference count value 250 allows for changing both the reference count value 250 and the garbage collection value 240 for a slot to be atomically modified. This can eliminate race conditions where one thread modifies the reference count value 250 and becomes descheduled, another thread modifies the garbage collection value 240 and the reference count value 250, and then the original thread is rescheduled and attempts to modify the garbage collection value 240 after the state has already changed.

The garbage collection values 240 are values usable to indicate a memory usage status with respect to associated storage slots in the storage array 230. The garbage collection values 240 can be used to implement a form of in-situ optional reference counting. The garbage collection values 240 can be fixed such that particular values indicate particular statuses. In an example, the values can be integers with different integers corresponding to different statuses. In the example discussed above, the values can be one or more bits of the reference count value 250 that correspond to different statuses. The garbage collection values 240 can include values relating to one or more of the following statuses: shared, poisoned, reset, and accessed. Other statuses can also be indicated. In an example, the garbage collection values 240 indicate only a poisoned value or a non-poisoned value (e.g., by having a value of "1" indicating poisoned" and a value of "0" indicating non-poisoned), with potential other statuses being inferable based on whether an associated garbage collection value 240 indicates a poisoned or a non-poisoned status and one or more other pieces of data (e.g., an associated reference count).

A shared status can indicate that the associated storage slot in the storage array 230 is being used by one or more threads. The number of threads can be indicated by the reference count value 250. The shared status can be inferred based on a non-poisoned garbage collection value and an associated reference count value 250 being non-zero. In addition, a sentinel value can be returned to threads that have access to the slot of the storage array 230. The sentinel value can be used to release the associated storage array slot at some point in the future.

A poisoned status establishes a happens-before relationship with any share operations after which the value can no longer be shared. In other words, the poisoned status caps the associated reference count value 250 such that the reference count value 250 can only decrease until the associated slot in the storage array 230 is reclaimed using the garbage collection process.

A reset status occurs when the associated slot is freed and the slot is un-poisoned so the slot can be re-used to store a new value 24.

The accessed status indicates that garbage collection monitoring is not being applied to the associated slot in the storage array 230. The accessed status effectively indicates that garbage collection is disabled for the associated slot. A single hash table 200 can mix entries having garbage collection monitoring with those that are not being monitored for garbage collection. While garbage collection is valuable for managing memory and while garbage collection techniques disclosed herein are suitable for use in HPC applications, nonetheless there is an associated amount of overhead. So in certain use cases, disabling garbage collection for certain slots in the storage array 230 (e.g., where the storage slot is associated with a key 22 that will be frequently reused) can be advantageous.

The reference count value 250 is a value usable to determine when a portion of memory is no longer being referenced, and therefore can be deallocated. For example, each reference count value 250 of the set of reference count values 250 can be an integer storing a number indicating how many threads reference the associated slot in the storage array 230. The reference count value 250 can be incremented each time a thread receives a pointer to the storage slot and decremented when such a pointer is released.

The collection map 260 stores data indicating which slots of the storage array 230 are potentially available for collection (e.g., have been poisoned). Like the storage bitmap 210, the collection map 260 can be implemented as a bitmap, where each bit of the bitmap indicates a status of a respective slot in the storage array 230.

Figure 3:
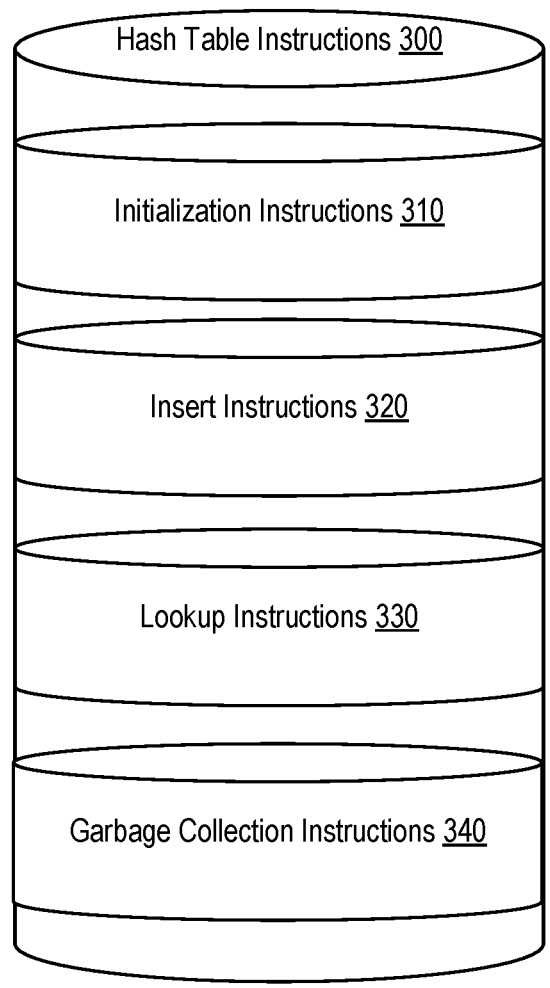
FIG. 3 illustrates hash table instructions.

The hash table 200 can be initialized and interacted with according to hash table instructions 300, which are described in relation to FIG. 3.

Hash Table Instructions

FIG. 3 illustrates hash table instructions 300. The hash table instructions 300 can be stored on a non-transitory computer-readable medium and executed by one or more processors to perform operations. As illustrated, the hash table instructions 300 can include initialization instructions 310, insert instructions 320, lookup instructions 330, and garbage collection instructions 340.

The initialization instructions 310 are instructions that, when executed by one or more processors, cause the one or more processors to perform an initialization process for initializing the hash table 200. The initialization instructions 310 and initialization process are described in more detail in relation to FIG. 4.

The insert instructions 320 are instructions that, when executed by one or more processors, cause the one or more processors to perform an insert process for inserting a key-value pair into the hash table 200. The insert instructions 320 and insert process are described in more detail in relation to FIG. 5.

The lookup instructions 330 are instructions that, when executed by one or more processors, cause the one or more processors to perform a lookup process for returning a value corresponding to a given key from the lock-free hash table. The lookup instructions 330 and lookup process are described in more detail in relation to FIG. 6.

The garbage collection instructions 340 are instructions that, when executed by one or more processors, cause the one or more processors to perform a garbage collection operation on the hash table based on the garbage collection values. The garbage collection instructions 340 are described in more detail in relation to FIG. 7.

Initialization Instructions

Figure 4:
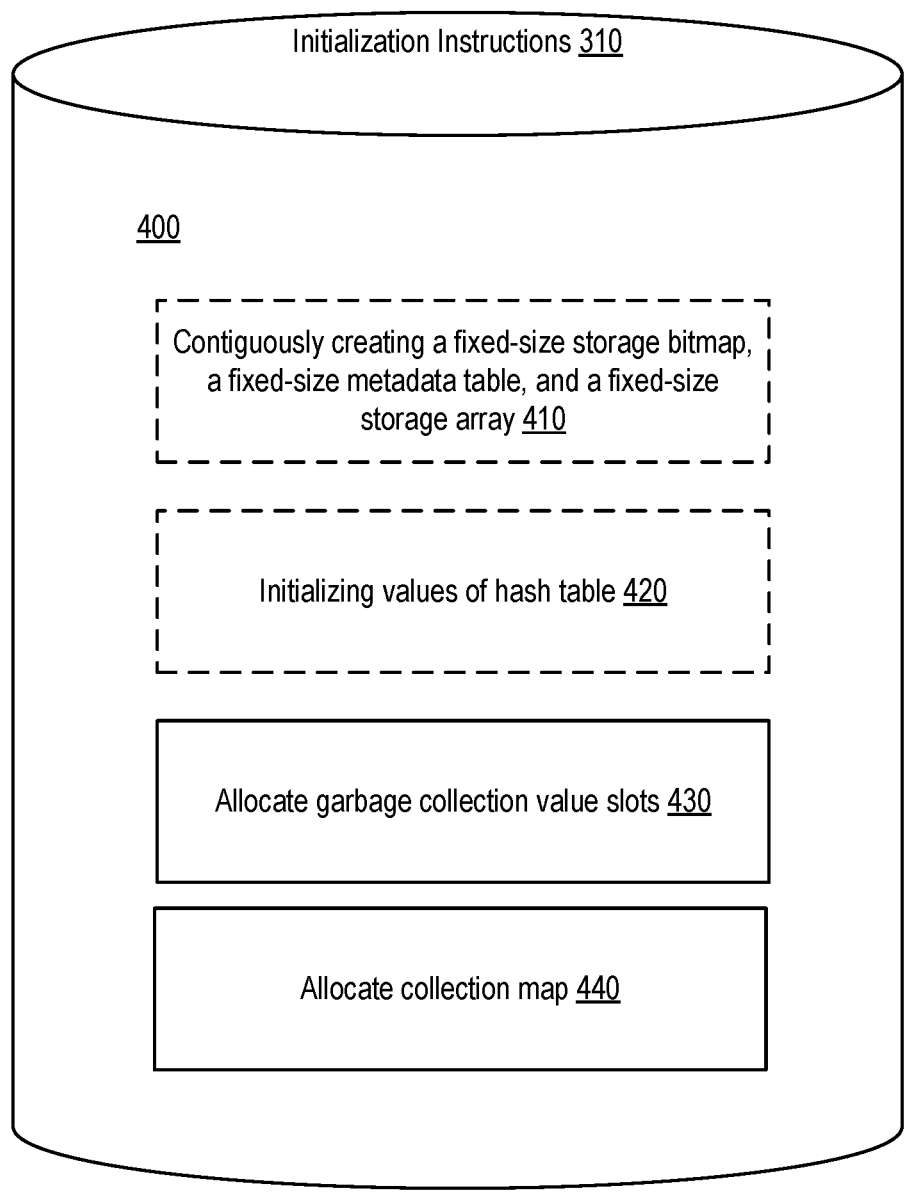
FIG. 4 illustrates initialization instructions and initialization operations.

FIG. 4 illustrates initialization instructions 310 and an initialization process 400. The process 400 can be used to initially create the hash table 200. For example, a running program can run the initialization process 400 to create an instance of the hash table 200. The process 400 can include operation 430 and operation 440 and, in some implementations, operation 410 and operation 420.

Operation 410 includes creating the storage bitmap 210, the metadata table 220, and the storage array 230. This operation 410 can include obtaining a contiguous block of the memory 10 from a system memory manager. The contiguous block can be a fixed-size portion of the memory 10. The creating can be based on a given desired size for the hash table 200, the hash table size 201. The hash table size 201 can specify then number of storage slots to be created in the storage array 230. The hash table size 201 can also be the size of the metadata table 220 (e.g., the number of mapping entries 222 can be equal to the hash table size 201). The hash table size 201 can further be the number of bits of the storage bitmap 210. So based on the given hash table size 201, the size of the contiguous block of the memory 10 needed to store the hash table 200 can be determined. The hash table size 201 can be fixed, so the size of the storage bitmap 210, the metadata table 220, and the storage array 230 can all be fixed and predetermined (e.g., determined from the given hash table size 201 during the initialization). The operation 410 can include contiguously creating a fixed-size storage bitmap 210, a fixed-size metadata table 220, and a fixed-size storage array 230 in memory.

Operation 420 includes initializing values of the hash table 200. In an example, when the hash table 200 is created initially, the memory allocated to the hash table 200 can be zeroed out and tombstone values can be written into each of the location values in the metadata table 220. Tombstone values are special values that represent the logical absence of a value. If a thread detects a tombstone value in a given slot, the thread can treat the slot as empty. Initializing to tombstone values can be beneficial because when a hashed value is added to a mapping entry, that mapping entry becomes immediately visible to threads attempting to do a lookup. If the slots are not initialized to tombstone values, another thread may attempt to lookup the location after the hashed value is written but before the location is written. If the locations are not initialized to tombstone values, the thread performing the lookup may load whatever data happens to be in the unwritten location slot, which can cause errors. By contrast, if the thread performing the lookup determines that the location is a tombstone value, the thread can determine that there is not actually a valid value in the location.

In some initialization operations, it can be known or predetermined that the data that will be used will be frequently updated. In such situations, the initialization instructions 310 can provide for the addition of padding during allocation to allow the hash table 200 to be friendlier to the potential access pattern. However, the addition of padding can come as a tradeoff, such as by increasing the memory footprint of the hash table 200 and adding pressure to the caching system and the prefetch system.

Operation 430 includes allocating slots for the garbage collection values 240. The allocating can vary depending on how the garbage collection values 240 are formatted. For instance, where the garbage collection values 240 are integers, memory can be allocated for the garbage collection values sufficient to fit the garbage collection values 240 formatted as integers. As described above, in some examples, the garbage collection values 240 can defined by one or more high-order bits of reference count values 250. In such examples, the garbage collection value slots can be allocated with the reference count values 250.

Operation 440 includes allocating the collection map 260. As with the allocation of space for the garbage collection values 240, the allocating can vary depending on how the collection map 260 is formatted. In an example, the collection map 260 is a bitmap where each bit of the bitmap corresponds to a different slot in the storage array 230.

Insert Instructions

Figure 5:
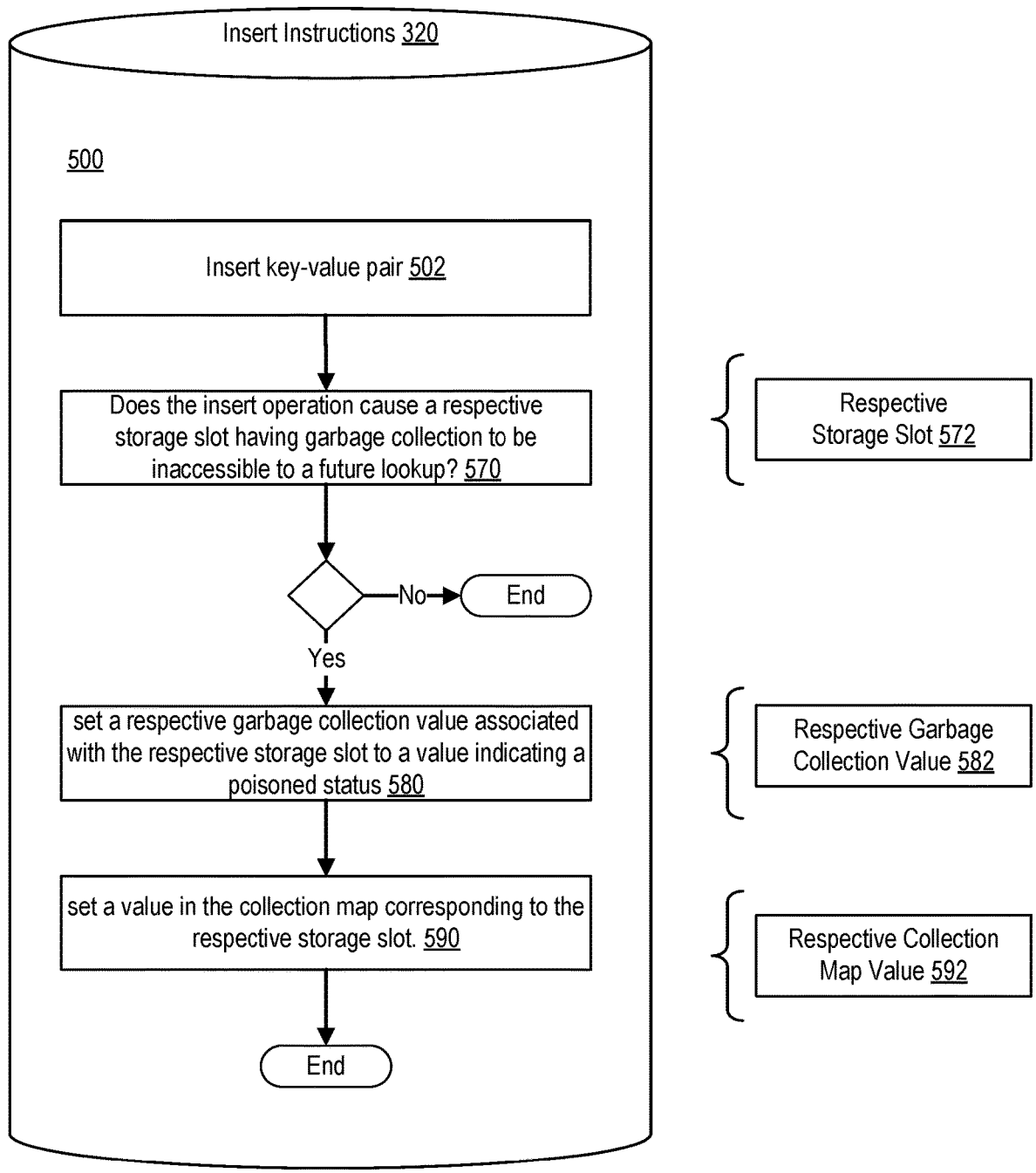
FIG. 5 illustrates insert instructions and insert operations.

FIG. 5 illustrates insert instructions 320 and an insert process 500. The insert process 500 can be used to add a key-value pair 20 to the hash table 200 and setting values as needed for garbage collection. The process 500 can begin with operation 502.

Operation 502 includes inserting a key-value pair 20 into the hash table 200. For example, where the key 22 of the key-value pair 20 already exists in the hash table, the value 24 stored in the storage array 230 associated with a hash of the key 22 is updated to be the value 24 of the key-value pair 20. Where the key 22 of the key-value pair 20 does not already exist in the hash table 200, the value 24 is added to a location in the storage array 230 based on the hashed key 26 produced by hashing the key 22 with the hash function 30 associated with the hash table 200. An example insert key-value pair process is described in relation to FIG. 8 as process 800. Following operation 502 (e.g., following operation 560 of FIG. 8), the flow of the process 500 can move to operation 570.

Operation 570 includes determining whether operation 502 caused a respective storage slot 572 being monitored for garbage collection to be inaccessible to a future lookup. This operation 570 has two sub-determinations: (1) whether the respective storage slot 572 is being monitored for garbage collection purposes and (2) whether the respective storage slot 572 has been made inaccessible to future lookup.

Regarding whether the respective storage slot 572 is being monitored for garbage collection purposes, as discussed above, not all slots of the storage array 230 need to be monitored for garbage collection. As such, the operation 570 can include, for example, determining whether a garbage collection value 240 associated with the key 22 inserted into the hash table 200 has a value indicating an accessed status. Responsive to a respective storage slot 572 having an accessed status, the respective storage slot 572 is not being monitored for garbage collection. In some examples, a function associated with the insert process 500 (e.g., the function called to begin the process 500) specifies whether or not garbage collection monitoring is being requested for the key 22.

Regarding whether the respective storage slot 572 has been made inaccessible to future lookup, inserting a key-value pair 20 into the hash table 200 can result in a configuration of the hash table 200 such that no valid key 22 will cause a lookup process (e.g., lookup process 600 of FIG. 6) to return the contents or the location of the contents of the respective storage slot 572. For instance, a mapping entry 222 that referenced the respective storage slot 572 in the metadata table 220 may have been overwritten or modified such that none of the mapping entries 222 in the metadata table 220 reference the respective storage slot 572. However, simply because no mapping entry 222 references the respective storage slot 572 does not mean that one or more threads are not using the respective storage slot 572 (e.g., a thread may have previously gained access to the respective storage slot via a lookup operation), so it can be advantageous to wait to free memory associated with the respective slot 572 until no threads reference the respective storage slot 572. Prematurely performing garbage collection on the respective storage slot 572 can cause errors in threads relying on the respective slot 572.

Following operation 570, if either the respective storage slot 572 is not being monitored for garbage collection or the respective storage slot 572 was not made inaccessible to future lookup, then the process 500 ends. But if both the respective storage slot 572 is being monitored for garbage collection and the respective storage slot 572 has been made inaccessible to future lookup, then the flow of the process 500 moves to operation 580.

Operation 580 includes setting the respective garbage collection value 582 associated with the respective storage slot 572 to a value indicating a poisoned status. The manner in which this operation 580 is performed can vary depending on how the hash table 200 stores and manages garbage collection values 240. Where the garbage collection values 240 are stored as high-order bits of a reference count value, then the high-order bits corresponding to the garbage collection value 240 can be modified using bitwise operations to a value indicating a poisoned status. The setting of the respective garbage collection value 582 can be performed as an atomic operation. In an example, the respective garbage collection value 582 can be set using a compare-and-swap operation. In some examples, the setting of the respective garbage collection value 582 can further include decrementing a reference count value 250 associated with the respective garbage collection value 582. Advantageously, the use of an atomic operation in setting the respective garbage collection value 582 to a poisoned status can establish the guarantee that after the value is set indicating the poisoned status, a race condition cannot cause the respective garbage collection value 582 to be unpoisoned. Following operation 580, the flow can move to operation 590.

Operation 590 includes setting a respective collection map value 592 corresponding to the respective storage slot 572. This operation can include setting a respective collection map value 592 to a value indicating that a storage slot associated with the respective collection map value 592 is potentially ready to be garbage collected. Where the collection map 260 is a bitmap, setting the respective collection map value 592 can include setting a bit of the collection map 260 to a value (e.g., zero or one). In an example, the setting is performed as an atomic operation.

Following operation 590, the process 500 can end.

Lookup Instructions

Figure 6:
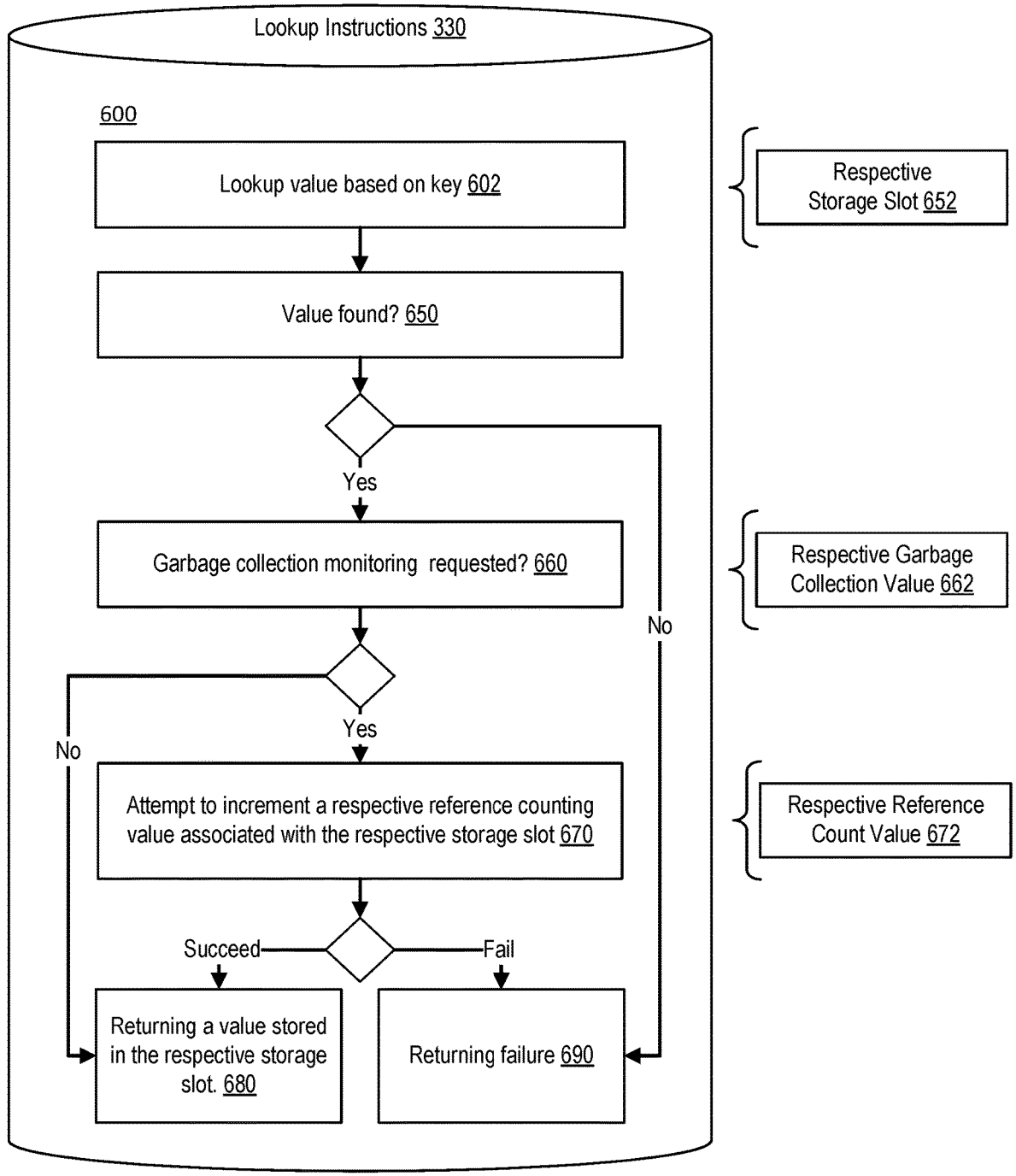
FIG. 6 illustrates lookup instructions and lookup operations.

FIG. 6 illustrates lookup instructions 330 and a lookup process 600. The lookup process 600 can be used to obtain the location of a slot in the storage array 230 that stores a value 24 in the hash table 200 corresponding to a given key 22. The process 600 can begin with operation 602.

Operation 602 includes performing a lookup for a value 24 based on a given key 22. As a result, the operation 602 can provide the location of a respective storage slot 652 in the hash table 200 where a value 24 corresponding to the key 22 is stored. If there is no value 24 in the hash table 200 based on the given key 22, then the lookup fails. An example lookup process is described in relation to FIG. 9 as process 900. Following operation 602, the flow can move to operation 650.

Operation 650 includes determining whether the lookup successfully found a respective storage slot 652 storing a value 24 associated with the given key 22. The success of locating the respective storage slot 652 can be determined based on the output of operation 602. If the lookup successfully found the respective storage slot 652, then the flow of the process 600 can move to operation 660. If the lookup failed, then the flow of the process 600 can move to operation 690.

Operation 660 includes determining whether garbage collection monitoring is requested for the respective storage slot 652. Whether garbage collection monitoring is requested can be determined based on a respective garbage collection value 662 associated with the respective storage slot 652. The respective garbage collection value 662 or other data can indicate whether garbage collection monitoring is requested (e.g., based on a whether an associated status is a poisoned, shared, or reset status) or not (e.g., based on an associated status being an accessed status). As a particular example, the garbage collection value 240 can be stored as one or more high-order bits of the reference count value 250 associated with the respective storage slot 652. To analyze the respective garbage collection value 662, the non-garbage-collection-value bits of the associated reference count value 250 can be masked off. The resulting bits can then be analyzed to determine whether the respective garbage collection value 662 indicates that garbage collection monitoring is or is not requested. In an example, where the respective garbage collection value 662 has a value indicating an accessed status, it can be determined that garbage collection monitoring is not requested. If the respective garbage collection value 662 indicates another status, then it can be determined that garbage collection monitoring is requested. In other examples, other data can be used to indicate whether garbage collection monitoring is requested.

Following operation 650, if garbage collection monitoring was requested, then the flow of the process 600 can move to operation 670. If garbage collection monitoring was not requested, then the process 600 can move to operation 680.

Operation 670 includes attempting to increment a respective reference count value 672 associated with the respective storage slot. This can include using an atomic operation to increment the reference count value 672. For example, a compare and swap operation can be used to increment the respective reference count value 672. The reference count value 672 can fail to increment if, for example, the respective garbage collection value 662 indicates a poisoned statutes. The operation 670 can be configured to be prevented from incrementing a poisoned value. In an example, as long as it is possible to increment the reference count value 672 (e.g., the reference count value is not poisoned), then the atomic operation to increment the reference count value 672 can be repeated until successful. So, in some examples, the attempt is not deemed a failure unless it is entirely prevented from succeeding or until after a threshold number of attempts have all failed.

If the attempt to increment the respective reference count value 672 was successful, then the flow of the process 600 can move to operation 680. If the attempt to increment the reference count value 672 failed, then the flow of the process 600 can move to operation 690.

Operation 680 includes returning a value 24 stored in the respective storage slot. For example, the value 24 (or a memory address thereof) can be returned to a calling thread. In some examples, the value 24 is returned with a sentinel value. For as long as the sentinel value is active, then the calling thread is able to use the value. But once the sentinel value is destroyed (e.g., the sentinel value leaves scope), then the thread can determine that the value 24 is unsafe to use.

Operation 690 includes returning an indication of failure to a calling thread. Returning failure can include, for example, returning a value that indicates that the operation failed. Returning failure can include throwing an exception.

Garbage Collection Instructions

Figure 7:
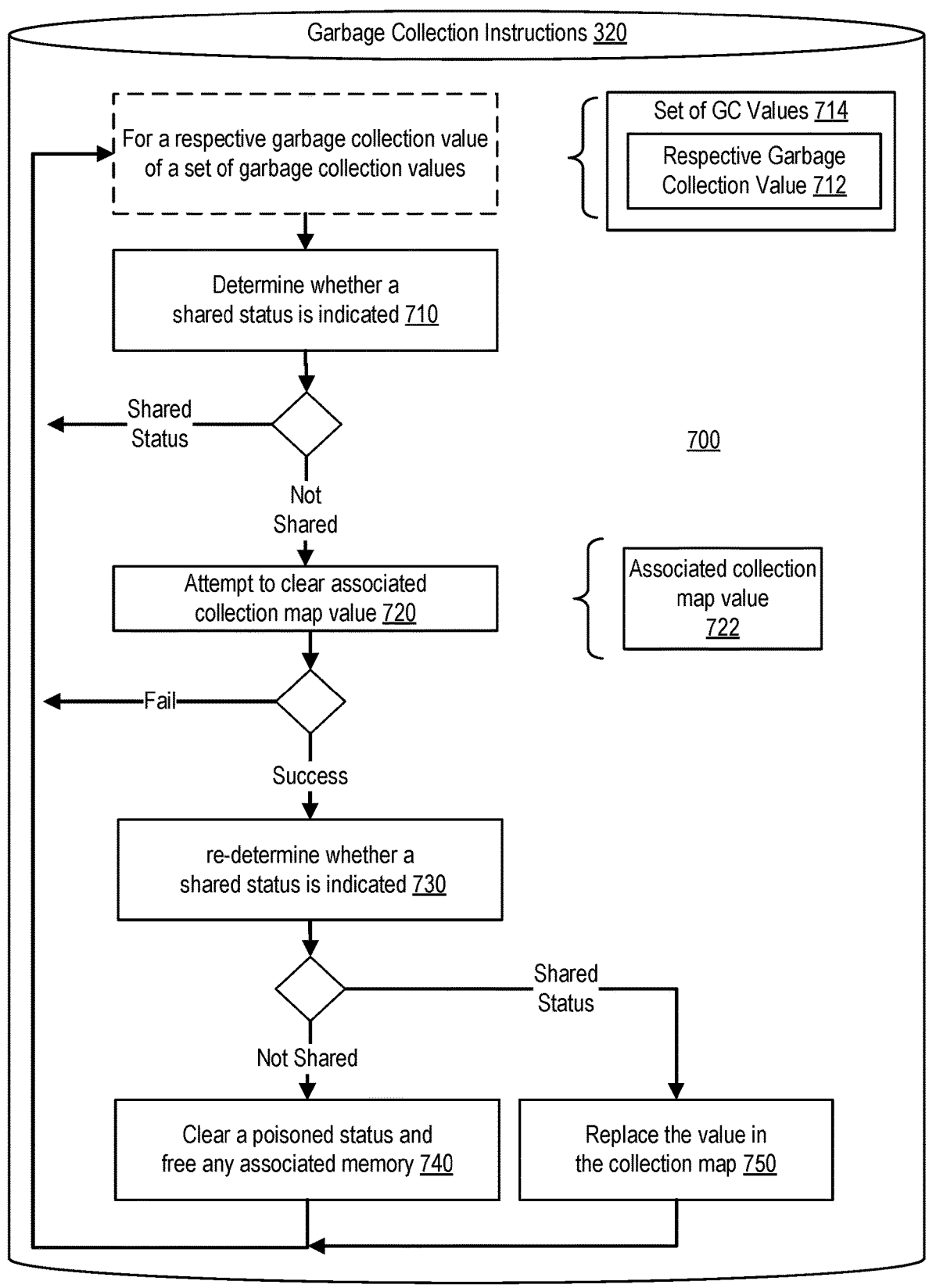
FIG. 7 illustrates garbage collection instructions and garbage collection operations.

FIG. 7 illustrates a garbage collection process 700 for performing garbage collection on a hash table 200 or another data structure. The garbage collection process 700 can free slots in the storage array 230 for reuse. The operations of the garbage collection process 700 are described with respect to a respective garbage collection value 712. In many examples, the process includes repeating the operations for each respective garbage collection value 712 of a set of garbage collection values 714. In some examples, the set of garbage collection values 240 include all garbage collection values 240 of the hash table 200. In other examples, the set of garbage collection values 714 are all garbage collection values 240 that have an associated collection value in the collection map 260 set in a manner indicating that the associated storage slot of the storage array 230 may be ready for garbage collection. The process 700 can begin with operation 710.

Operation 710 includes determining whether a shared status is indicated. This operation 710 can include determining whether a respective storage slot is currently being used or is ready for garbage collection. The shared status being indicated can be inferred based on the respective garbage collection value 712. For example, if the respective garbage collection value 712 has a poisoned status and an associated reference count is zero, then a shared status is not indicated. Where the garbage collection value 712 is stored as high-order bits of a reference count value 250, the operation 710 can include masking off other bits and analyzing the remaining bits to determine whether the status indicated by the respective garbage collection value 712 is a poisoned status. This determining can include analyzing the respective garbage collection value 712 to determine what status is indicated. A shared status being indicated can mean that the slot in the storage array 230 associated with the garbage collection value 712 is being shared and potentially used by one or more threads. As such, the associated storage slot is not ready to be garbage collected.

Following operation 710, if a shared status is indicated, then the flow of the process can return to operation 710 (e.g., for another respective garbage collection value 712 of the set of garbage collection values 714). If the shared status is not indicated, then the flow of the process 700 can move to operation 720.

Operation 720 includes attempting to clear an associated collection map value 722 that is associated with the respective garbage collection value 712. Clearing the associated collection map value 722 can include setting the value of the associated collection map value 722 to a different value that no longer indicates that the slot in the storage array 230 associated with the associated collection map value 722 is potentially ready for garbage collection. In some examples, this operation 720 is performed using an atomic operation. In some examples, the collection map 260 is stored as a bitmap and the operation 720 includes performing a compare and swap operation on the entire bitmap with a modified bit corresponding to the associated collection map value 722.

If the attempt in operation 720 fails, then the flow of the process 700 can return to operation 710. Otherwise, the flow of the process 700 to operation 730.

Operation 730 includes re-determining whether a shared status is indicated. Although the operation 710 already determined whether a shared status was indicated, the thread performing the process 700 may have been descheduled or the processing of operations otherwise disrupted such that one or more other threads may have modified the garbage collection value 712 or the reference count such that a shared status is indicated. For instance, ABA problems can allow for a race where the storage slot associated with the associated collection map value 722 is reallocated to another thread and then removed again after operation 710.

If the respective garbage collection value 712 still does not have the shared status, then the flow of the process 700 can move to operation 740. Otherwise, the flow the process 700 can move to operation 750.

Operation 740 includes clearing the respective garbage collection value 712 to no longer have a poisoned value and freeing associated memory. Freeing the associated memory can include freeing memory of the storage slot corresponding to the respective garbage collection value. Freeing the memory can include, for example, setting a corresponding bit in the storage bitmap 210 to indicate that the slot is available for allocation. Following operation 740, the flow of the process 700 can return to operation 710 for another garbage collection value of the set of garbage collection values 714.

Operation 750 includes replacing the value in the collection map 260. This operation 750 can include setting the associated collection map value 722 to the value that the associated collection map value 722 had before it was cleared in operation 720. Following operation 750, the flow of the process 700 can return to operation 710 for another garbage collection value of the set of garbage collection values 714.

Insert Key-Value Pair

Figure 8:
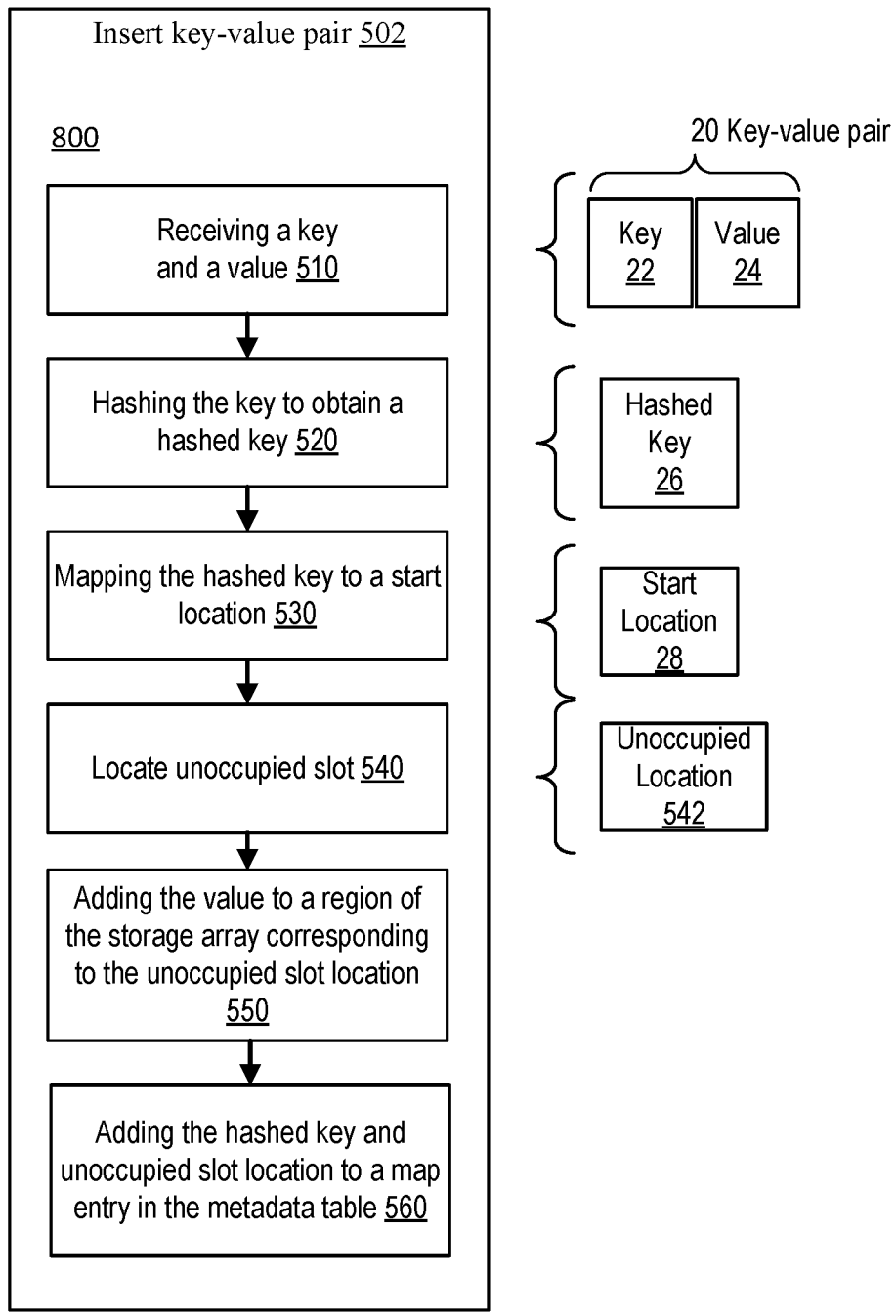
FIG. 8 illustrates an example process for inserting a key-value pair.

FIG. 8 illustrates a process 800 for inserting a key-value pair 20 into a data structure. In an example, the process 800 can be performed as part of operation 502 of FIG. 5. The process 800 can begin with operation 510.

Operation 510 includes receiving a key 22 and a value 24. In some examples, the key 22 and the value 24 are received as a key-value pair 20. In some examples, the hash table 200 or an associated library can expose a callable function that allows for a thread to provide a key 22 and a value 24 to be inserted into the hash table 200. Following operation 510, the flow of the process 500 can move to operation 520.

Operation 520 includes hashing the key 22 to obtain a hashed key 26. In an example, the operation 520 includes calling the hash function 30 associated with the hash table 200 with the key 22 as input to obtain the hashed key 26 as output. In many examples, the resulting hashed key 26 is a number, such as an integer. The qualities of the hashed key 26 can vary depending on the kind of hash function 30 used. Following operation 520, the flow can move to operation 530.

Operation 530 includes mapping the hashed key 26 to a start location 28. In an example, operation 530 includes calling the mapping function 40 or executing one or more lines of code that perform a mapping using the hashed key 26 as input. In many examples, the hash table size 201 is used during the mapping process. As described above in relation to FIG. 1, the mapping can include converting the hashed key 26 into a valid location in the hash table 200 based on the hash table size 201. In an example, the mapping includes performing h modulo n, where h is the hashed key 26 and n is the hash table size 201. In an example where n is a power of two, the mapping includes evaluating the equation h & (n−1), where "&" is the bitwise AND operation, h is the hashed key 26, and n is the hash table size 201. The result of the mapping is the start location 28. Following operation 530, the flow can move to operation 540.

Operation 540 includes locating an unoccupied location 542 in the hash table 200. The unoccupied location 542 can be an unoccupied slot of the hash table 200.

In many examples, the locating of the unoccupied location 542 is based on the start location 28. For instance, the operation 540 can include determining whether a bit in the storage bitmap 210 corresponding to the start location 28 indicates that the storage array 230 slot corresponding to the start location 28 is available. This operation 540 can include checking the ith bit of the storage bitmap 210 to determine whether the value is one or zero, where i is a number corresponding to the start location 28 (e.g., where the start location 28 is one, i is one). If the value indicates that the slot is available (e.g., a value of one can indicate that the slot is available and a value of zero can indicate that the slot is unavailable), then the unoccupied location 542 is determined to be the same as the start location 28. If the value indicates that the slot is unavailable, then additional slots are probed until an available slot is determined. Once an available slot is reached, the unoccupied location 542 can be determined to be the location of the available slot.

In some examples, the locating of the unoccupied location 542 is not based on the start location 28. For instance, the operation 540 can include determining whether the first bit in the storage bitmap 210 (e.g., the zeroth bit if the storage bitmap 210 is indexed from zero or the first bit if the storage bitmap 210 is indexed from one) indicates that the storage array 230 slot corresponding to the first bit is available. This operation 540 can include checking the value of the first bit of the storage bitmap 210 to determine whether the value is one or zero. If the value indicates that the slot is available (e.g., a value of one can indicate that the slot is unavailable and a value of zero can indicate that the slot is available), then the unoccupied location 542 is determined to be a location associated with that bit. If the value indicates that the slot is unavailable, then additional slots are probed. The unoccupied location 542 can be determined to be the available slot.

Probing for additional slots can be performed using any of a variety of techniques. In many examples herein, linear probing is advantageous to allow for speed increases due to prefetching. Linear probing includes checking the next location to determine whether it is available. For example, in many implementations linear probing checks the next slot (e.g., an adjacent slot) by adding one to the current location (e.g., where the current slot is the first slot, linear probing would include checking the second slot, then the third slot, and so on until an available slot is located). Other techniques can also be used, such as quadratic probing.

Using the start location 28 (which is based on the hashed key 26) as the basis for where to start looking for an unoccupied location 542 is advantageous by avoiding clustering in the storage bitmap 210. Starting the search for an unoccupied location 542 at the beginning of the storage bitmap, can result in clustering of occupied and unoccupied location 542, which can be slow due to the need to probe several successive bits to find an unoccupied location 542. By contrast, beginning the search from the start location 28 allows for relatively even spread of allocation across the storage bitmap 210, which makes it easier to locate unoccupied locations 542 and keeps toward as constant time as possible.

Once the unoccupied location 542 is located, the storage bitmap 210 can be updated to reflect that the unoccupied location 542 will become occupied. In an example, the updating is performed as an atomic operation. Advantageously, this can allow a calling thread to perform atomic swapping of values into the hash table 200. In particular, configurations of hash tables 200 disclosed herein can allow for the generalization of compare and swap with arbitrarily sized data. For example, a thread can compare-and-swap a key and the hash table 200 is able to guarantee that that thread is the only thread that obtained that data. This feature is extremely useful for various workloads. Further, this can guarantee that the calling thread that obtained the slot in the storage array 230 is the only thread that has write access to the location in the storage array 230. As can be seen from the above, the process of adding a value to the hash table 200 can be performed without relying on a memory manager outside of the initialization instructions (e.g., relying on an operating system level memory manager). This can be because the memory for the storage array 230 was already allocated during, for example, the initialization process 400. During the identification of available or unavailable slots (which can be analogous to identifying allocated and unallocated memory locations), the storage bitmap 210 is used and such a process can act as an actual or pseudo memory manager without needing to rely on another memory manager (e.g., without relying on an operating system level memory manager). Thus, the insert key-value pair operations use the storage bitmap 210 to identify available memory locations in the storage array 230 of the hash table 200. Following operation 540, the flow can move to operation 550.

Operation 550 includes adding the value 24 to a region of the storage array 230 corresponding to the unoccupied location 542. Following operation 550, the flow can move to operation 560.

Operation 560 includes adding the hashed key 26 and the unoccupied slot location to the metadata table 220. This operation 560 can include probing for a slot belonging to, or available for, the hashed key 26. The probing can begin at the start location 28 (even if the allocated slot is different from the start location 28). If the probed location is unoccupied, then the thread attempts to put (e.g., using a compare-and-swap operation) the hashed key 26 into the portion of the metadata table corresponding to hashed keys 26 and then attempts to put (e.g., using a compare-and-swap operation) the storage index corresponding to the stored value into the metadata table 220. If the probed location already has the hashed key 26 in the location (i.e., the hashed key 26 already exists in the metadata table), then the thread attempts to put (e.g., using a compare-and-swap operation) the storage location (e.g., data corresponding to the unoccupied location 542) into the metadata table, thereby finishing the insertion. If the thread makes it the entire way around the table without locating a slot that is either unoccupied or already has the hashed key 26, then the thread deallocates the value from the storage array 230 (e.g., by marking the corresponding location in the storage bitmap 210 as empty and, in some implementations, zeroing out the slot in the storage array 230) and returns failure to the code that requested insertion.

Lookup Instructions

Figure 9:
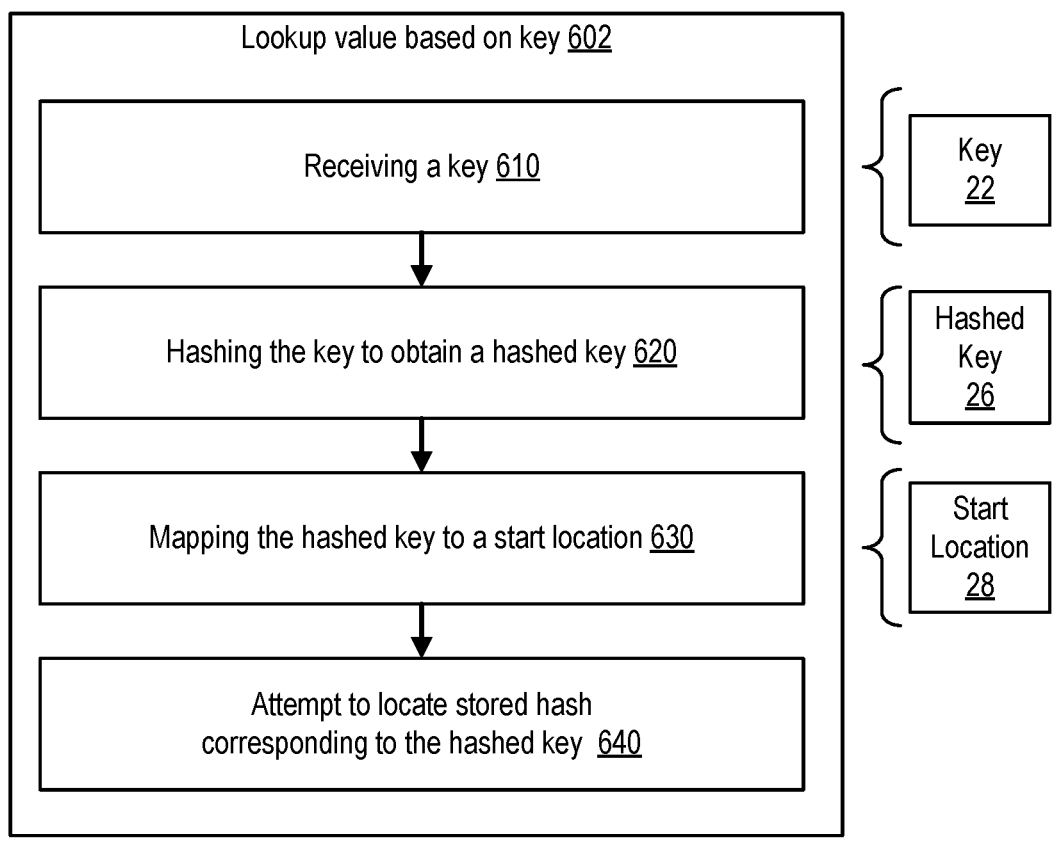
FIG. 9 illustrates an example process for performing a lookup operation.

FIG. 9 illustrates process 900 for performing a lookup on a value 24 in the hash table 200 corresponding to a given key 22. In an example, the process 900 can be performed as part of operation 602 in FIG. 6. The process 900 can begin with operation 610.

Operation 610 includes receiving a key 22. In some examples, the hash table 200 or an associated library can expose a callable function that allows for a thread to receive a key 22 to be looked up in the hash table 200. Following operation 610, the flow of the process 600 can move to operation 620.

Operation 620 includes hashing the key 22 to obtain a hashed key 26. Operation 620 can be as described in operation 520. Following operation 620, the flow can move to operation 630.

Operation 630 includes mapping the hashed key 26 to a start location 28. This operation can be as described in operation 530. Following operation 630, the flow can move to operation 640.

Operation 640 includes attempting to locate a stored hash corresponding to the hashed key 26. This operation 640 can include probing for a slot having a hashed key 26 corresponding to the hashed key 26. The probing can begin at the start location 28. If the probed location is unoccupied or includes a hashed key 26 that does not correspond to the received hashed key 26, then the probing continues. If the probed location has the hashed key 26 in the location, then the storage location of the mapping entry 222 having the hashed key 26 is obtained. Then the value 24 stored in the storage array 230 via the storage location is obtained and returned to the calling thread. If the thread makes it the entire way around the metadata table 220, then the operation returns failure indicating that the provided key 22 is not within the hash table 200.

Computing System

Figure 10:
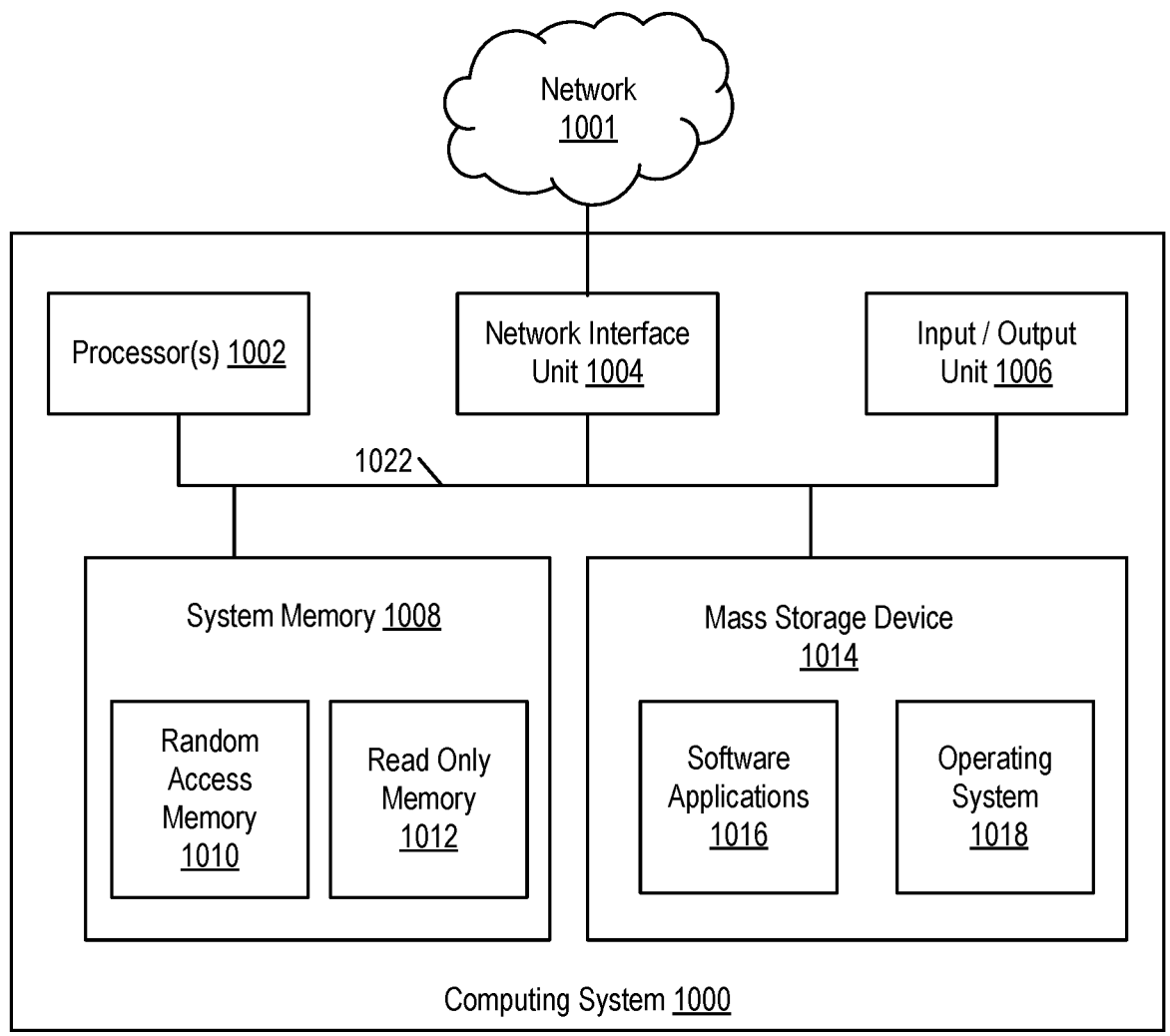
FIG. 10 illustrates an example block diagram of a computing system.

FIG. 10 illustrates an example block diagram of a virtual or physical computing system 1000. One or more aspects of the computing system 1000 can be used to implement the hash table 200, store instructions described herein, and preform operations described herein.

In the embodiment shown, the computing system 1000 includes one or more processors 1002, a system memory 1008, and a system bus 1022 that couples the system memory 1008 to the one or more processors 1002. The system memory 1008 includes RAM (Random Access Memory) 1010 and ROM (Read-Only Memory) 1012. A basic input/output system that contains the basic routines that help to transfer information between elements within the computing system 1000, such as during startup, is stored in the ROM 1012. The computing system 1000 further includes a mass storage device 1014. The mass storage device 1014 is able to store software instructions and data. The one or more processors 1002 can be one or more central processing units or other processors.

The mass storage device 1014 is connected to the one or more processors 1002 through a mass storage controller (not shown) connected to the system bus 1022. The mass storage device 1014 and its associated computer-readable data storage media provide non-volatile, non-transitory storage for the computing system 1000. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1000.

According to various embodiments of the invention, the computing system 1000 may operate in a networked environment using logical connections to remote network devices through the network 1001. The network 1001 is a computer network, such as an enterprise intranet and/or the Internet. The network 1001 can include a LAN, a Wide Area Network (WAN), the Internet, wireless transmission mediums, wired transmission mediums, other networks, and combinations thereof. The computing system 1000 may connect to the network 1001 through a network interface unit 1004 connected to the system bus 1022. It should be appreciated that the network interface unit 1004 may also be utilized to connect to other types of networks and remote computing systems. The computing system 1000 also includes an input/output controller 1006 for receiving and processing input from a number of other devices, including a touch user interface display screen, or another type of input device. Similarly, the input/output controller 1006 may provide output to a touch user interface display screen or other type of output device.

As mentioned briefly above, the mass storage device 1014 and the RAM 1010 of the computing system 1000 can store software instructions and data. The software instructions include an operating system 1018 suitable for controlling the operation of the computing system 1000. The mass storage device 1014 and/or the RAM 1010 also store software instructions, that when executed by the one or more processors 1002, cause one or more of the systems, devices, or components described herein to provide functionality described herein. For example, the mass storage device 1014 and/or the RAM 1010 can store software instructions that, when executed by the one or more processors 1002, cause the computing system 1000 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of hash tables, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method comprising:
   for a respective garbage collection value of a set of garbage collection values, performing a garbage collection operation associated with a memory slot comprising:
   determining that a shared status is not indicated when the respective garbage collection value indicates a poisoned status and a reference count value associated with the memory slot is zero, wherein the poisoned status indicates that the memory slot is no longer accessible for share operations and the reference count value indicates a number of threads that are accessing the memory slot;
   responsive to determining that a shared status is not indicated, attempting to successfully clear an associated collection map value in a collection map, wherein successfully clearing the associated collection map value includes setting the associated collection map value to a value that no longer indicates that the memory slot is ready for garbage collection; and
   responsive to successfully clearing the associated collection map value in the collection map, clearing the poisoned status of the respective garbage collection value,
   wherein clearing the respective garbage collection value includes setting the respective garbage collection value to a reset value that indicates that the memory slot is ready to be re-used to store a new value.

2. The method of claim 1, wherein the respective garbage collection value is stored as one or more bits of the reference count value stored as an integer.

3. The method of claim 1, further comprising:
   responsive to successfully clearing the associated collection map value in the collection map, re-determining whether a shared status is indicated based on the respective garbage collection value,
   wherein setting the respective garbage collection value to a reset status is further responsive to the re-determination that the shared status is not indicated.

4. The method of claim 1, wherein attempting to clear the associated collection map value in the collection map includes clearing the associated collection map value as an atomic operation.

5. The method of claim 1, wherein the garbage collection operation is performed for each respective garbage collection value in the set of garbage collection values.

6. The method of claim 1, wherein the poisoned status caps the reference count value such that the reference count value decreases until the memory slot is reclaimed using the garbage collection operation.

7. The method of claim 1, wherein the memory slot is part of a storage array.

8. The method of claim 7, wherein the collection map is implemented as a bitmap with each bit being associated with a different memory slot in the storage array.

9. The method of claim 1, wherein respective garbage collection value is stored as high-order bits of the reference count value.

10. A system comprising:
one or more processors; and
a non-transitory computer-readable medium comprising instructions that, when executed by the one or more processors, causes the one or more processors to:
for each respective garbage collection value of a set of garbage collection values, wherein the each respective garbage collection value is associated with a memory slot:
determine that a shared status is not indicated when the respective garbage collection value indicates a poisoned status and a reference count value associated with the memory slot is zero, wherein the poisoned status indicates that the memory slot is no longer accessible for share operations and the reference count value indicates a number of threads that are accessing the memory slot;
responsive to determining that a shared status is not indicated, attempt to successfully clear an associated value in a collection map, wherein successfully clearing the associated collection map value includes setting the associated collection map value to a value that no longer indicates that the memory slot is ready for garbage collection; and
responsive to successfully clearing the associated value in the collection map, clearing the respective garbage collection value,
wherein clearing the respective garbage collection value includes setting the respective garbage collection value to a reset value that indicates that the memory slot is ready to be re-used to store a new value.

11. The system of claim 10, wherein the instructions further cause the one or more processors to:
responsive to successfully clearing the associated value in the collection map, re-determine whether the shared status is indicated,
wherein clearing the respective garbage collection value is further responsive to re-determining that the shared status is not indicated.

12. The system of claim 11, wherein the instructions further cause the one or more processors to:
responsive to the re-determined respective garbage collection value indicating a shared status, replace the associated value in the collection map.

13. The system of claim 10, wherein the instructions further cause the one or more processors to:
responsive to failing to clear the associated value in the collection map, skip the respective garbage collection value and continue to a next respective garbage collection value in the set of garbage collection values.

14. The system of claim 10, wherein attempting to clear the associated value is performed as an atomic operation.

15. The system of claim 10, wherein the set of garbage collection values include at least one garbage collection value indicating a poisoned status.

16. The system of claim 10, wherein the poisoned status caps the reference count value such that the reference count value decreases until the memory slot is reclaimed using the garbage collection operation.

17. The system of claim 10, wherein the memory slot is part of a storage array.

18. The system of claim 17, wherein the collection map is implemented as a bitmap with each bit being associated with a different memory slot in the storage array.

19. The system of claim 10, wherein respective garbage collection value is stored as high-order bits of the reference count value.

* * * * *